US009684907B2

(12) United States Patent
Bernosky

(10) Patent No.: US 9,684,907 B2
(45) Date of Patent: Jun. 20, 2017

(54) NETWORKING WITH MEDIA FINGERPRINTS

(75) Inventor: Philip J. Bernosky, Saratoga, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 769 days.

(21) Appl. No.: 13/059,481

(22) PCT Filed: Aug. 21, 2009

(86) PCT No.: PCT/US2009/054565
§ 371 (c)(1),
(2), (4) Date: Feb. 17, 2011

(87) PCT Pub. No.: WO2010/022301
PCT Pub. Date: Feb. 25, 2010

(65) Prior Publication Data
US 2011/0153417 A1    Jun. 23, 2011

Related U.S. Application Data

(60) Provisional application No. 61/090,716, filed on Aug. 21, 2008.

(51) Int. Cl.
*G06Q 30/02* (2012.01)

(52) U.S. Cl.
CPC ......... *G06Q 30/02* (2013.01); *G06Q 30/0251* (2013.01)

(58) Field of Classification Search
USPC ........................................................ 705/14
See application file for complete search history.

(56) References Cited

U.S. PATENT DOCUMENTS

| 2002/0103920 | A1 | 8/2002 | Berkun | |
| 2003/0061490 | A1* | 3/2003 | Abajian | ................. 713/176 |
| 2005/0147256 | A1* | 7/2005 | Peters et al. | ................. 381/56 |

(Continued)

FOREIGN PATENT DOCUMENTS

| CN | 1770159 | 5/2006 |
| CN | 10120780 | 6/2008 |

(Continued)

OTHER PUBLICATIONS

Smith, et al., "Visually Searching the Web for Content" IEEE Multimedia, IEEE Service Center, New YOrk, NY, US, vol. 4, No. 3, Jul. 1, 1997 (Jul. 1, 1997), pp. 12-20.

*Primary Examiner* — Fonya Long
*Assistant Examiner* — Rodney Henry

(57) ABSTRACT

An information element, uniquely related to a media fingerprint that is uniquely derived from a media content portion during play out thereof, is provided to a first web page. The first web page stores the information element with an associated first information set, which relates to one or more media fingerprints. One or more second web pages store at least a second information set, which relates to one or more media fingerprints. The first and at least second web pages are accessed and crawled in relation to the first and the at least second information sets. One or more information elements, which are common to the first and the at least second information sets, are indexed. The first web page and the at least one of the second web pages are related based on the indexed common information elements.

23 Claims, 3 Drawing Sheets

(56) References Cited

U.S. PATENT DOCUMENTS

| | | | |
|---|---|---|---|
| 2006/0212899 A1* | 9/2006 | Steelberg et al. | 725/32 |
| 2007/0042767 A1* | 2/2007 | Stepanian | 455/420 |
| 2007/0217648 A1 | 9/2007 | Muehlbauer | |
| 2008/0010139 A1* | 1/2008 | Elmer et al. | 705/14 |
| 2008/0059522 A1* | 3/2008 | Li et al. | 707/104.1 |
| 2008/0077955 A1* | 3/2008 | Haberman | 725/35 |
| 2008/0140523 A1* | 6/2008 | Mahoney et al. | 705/14 |
| 2008/0256647 A1* | 10/2008 | Kim et al. | 726/32 |
| 2008/0288411 A1* | 11/2008 | Copley | 705/52 |
| 2009/0056525 A1* | 3/2009 | Oppenheimber | G06F 17/30743 84/609 |
| 2009/0063277 A1 | 3/2009 | Bernosky | |
| 2009/0083116 A1* | 3/2009 | Svendsen | G06F 17/30743 709/217 |
| 2010/0050118 A1* | 2/2010 | Chowdhury et al. | 715/810 |
| 2011/0022633 A1 | 1/2011 | Bernosky | |
| 2011/0035382 A1* | 2/2011 | Bauer et al. | 707/741 |

FOREIGN PATENT DOCUMENTS

| | | |
|---|---|---|
| EP | 1241594 | 9/2002 |
| WO | 2005036306 | 4/2005 |
| WO | 2009/046438 | 4/2009 |

\* cited by examiner

NETWORKING WITH MEDIA FINGERPRINTS

CROSS-REFERENCE TO RELATED APPLICATIONS

This application claims priority to U.S. Patent Provisional Application No. 61/090,716, filed 21 Aug. 2008, hereby incorporated by reference in its entirety.

TECHNOLOGY

The present invention relates generally to media. More specifically, embodiments of the present invention relate to networking with media fingerprints.

BACKGROUND

Audio and video media comprise an essentially ubiquitous feature of modern activity. Multimedia content, such as most modern movies, includes more than one kind of medium, such as both its video content and an audio soundtrack. Modern enterprises of virtually every kind and individuals from many walks of life use audio and video media content in a wide variety of both unique and related ways. Entertainment, commerce and advertising, education, instruction and training, computing and networking, broadcast, enterprise and telecommunications, are but a small sample of modern endeavors in which audio and video media content find common use.

Audio media include music, speech and sounds recorded on individual compact disks (CD) or other storage formats, streamed as digital files between server and client computers over networks, or transmitted with analog and digital electromagnetic signals. Examples of video media include movies and other recorded performances, presentations and animations, and portions thereof, sometimes called clips. It has become about as familiar to find users watching movies from Digital Versatile Disks (DVD) playing on laptop computers while commuting as at home on entertainment systems or in theaters. Concerts from popular bands are streamed over the internet and enjoyed by users as audio and/or viewed as well in webcasts of the performance. Extremely portable lightweight, small form factor, low cost players of digital audio files have gained widespread popularity. Cellular phones, now essentially ubiquitous, and personal digital assistants (PDA) and handheld computers all have versatile functionality. Not just telecommunication devices, modern cell phones access the Internet and stream audio and video content therefrom and, it is no longer unusual to find game enthusiasts participating in networked video game play and fans watching sporting events therewith.

As a result of its widespread and growing use, vast quantities of audio and media content exist. Given the sheer quantity and variety of audio and video media content that exist, and the expanding growth of that content over time, an ability to identify content is of value. Media fingerprints comprise a technique for identifying media content.

Media fingerprints are unique identifiers of media content from which they are extracted or generated. The term "fingerprint" is aptly used to refer to the uniqueness of these media content identifiers, in the sense that human beings are uniquely identifiable, e.g., forensically, by their fingerprints. While similar to a signature, media fingerprints perhaps even more intimately and identifiably correspond to the content. Audio and video media may both be identified using media fingerprints that correspond to each medium.

Audio media are identifiable with acoustic fingerprints. An acoustic fingerprint is generated from a particular audio waveform as code that uniquely corresponds thereto. Upon generating an acoustic fingerprint, the corresponding waveform from which the fingerprint was generated may thereafter be identified by reference to its fingerprint. The acoustic fingerprints may be stored, e.g., in a database. Stored acoustic fingerprints may be accessed to identify, categorize or otherwise classify an audio sample to which it is compared. Acoustic fingerprints are thus useful in identifying music or other recorded, streamed or otherwise transmitted audio media being played by a user, managing sound libraries, monitoring broadcasts, network activities and advertising, and identifying video content (such as a movie) from audio content (such as a soundtrack) associated therewith.

The reliability of an acoustic fingerprint relates to the specificity with which it identifiably corresponds with a particular audio waveform. Some audio fingerprints provide identification so accurately that they may be relied upon to identify separate performances of the same music. Moreover, some acoustic fingerprints are based on audio content as it is perceived by the human psychoacoustic system. Such robust audio fingerprints thus allow audio content to be identified after compression, decompression, transcoding and other changes to the content made with perceptually based audio codecs; even codecs that involve lossy compression (and which may thus tend to degrade audio content quality). Analogous to identifying audio media content by comparison with acoustic fingerprints is the ability to identify video media with digital video fingerprints.

Video fingerprints are generated from the video content to which they correspond. A sequence of video information, e.g., a video stream or clip, is accessed and analyzed. Components characteristic of the video sequence are identified and derived therefrom. Characteristic components may include luminance, chrominance, motion descriptors and/or other features that may be perceived by the human psychovisual system. The derived components are compressed into a readily storable and retrievable format.

Video fingerprints are generated using relatively lossy compression techniques, which render the fingerprint data small in comparison to their corresponding video content. Reconstructing original video content from their corresponding video fingerprints is thus typically neither practical nor feasible. As used herein, a video fingerprint thus refers to a relatively low bit rate representation of an original video content file. Storing and accessing the video fingerprints however is thus more efficient and economical than storing the original video content, from which the fingerprints are derived, in its entirety.

Stored video fingerprints may be accessed for comparison to a sample of a video sequence, which allows accurate identification of the video content in the sequence. Video fingerprints are thus useful for accurately identifying video content for a user as the content is viewed, as well as in authoritatively managing copyrights, and in validating authorized, and detecting unauthorized, versions and instances of content being stored, streamed or otherwise used. As with many acoustic fingerprints moreover, video fingerprints are perceptually encoded. Thus the content of the video sequence may be accurately identified by comparison to video fingerprints after compression, decompression, transcoding and other changes to the content made with perceptually based video codecs; even codecs that involve lossy compression (and which may thus tend to degrade video content quality).

Audio and video media content may be conceptually, commercially or otherwise related in some way to separate and distinct instances of content. The content that is related to the audio and video content which may include, but is not limited to other audio, video or multimedia content. For instance, a certain song may relate to a particular movie in some conceptual way. Other example may be text files or a computer graphics that relate to a given speech, lecture or musical piece in some commercial context. However, it may not be easy to ascertain the existence of some content that may be related to particular media content, much less to access the related content in association with the media content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF SUMMARY OF SOME ASPECTS OF AN EXAMPLE EMBODIMENT

The following paragraph presents a brief, simplified summary for providing a basic understanding of some aspects of an embodiment of the present invention. It should be noted that this summary is not an extensive overview of aspects of the embodiment. Moreover, it should be noted that this summary is not intended to be understood as identifying any particularly significant aspects or elements of the embodiment, nor as delineating any scope of the embodiment in particular, nor the invention in general. The following brief summary merely presents some concepts that relate to the example embodiment in a condensed and simplified format, and should be understood as merely a conceptual prelude to a more detailed Description of Example Embodiments that follows the summary.

Embodiments of the present invention relate to networking and advertising with media fingerprints. An information element, uniquely related to a media fingerprint that is uniquely derived from a media content portion during play out thereof, is provided to a first web page. The first web page stores the information element with an associated first information set, which relates to one or more media fingerprints. One or more second web pages store at least a second information set, which relates to one or more media fingerprints. The first and at least second web pages are accessed and crawled in relation to the first and the at least second information sets. One or more information elements, which are common to the first and the at least second information sets, are indexed. The first web page and the at least one of the second web pages are related based on the indexed common information elements.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
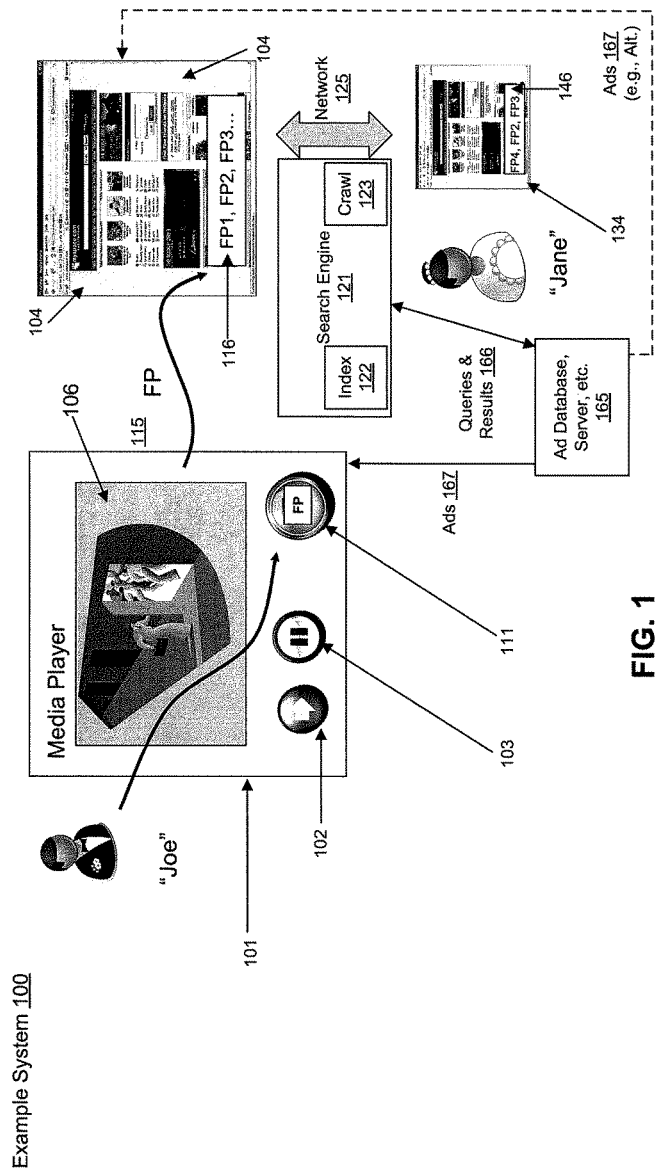
FIG. 1 depicts an example system, according to an embodiment of the present invention

Networking with media fingerprints is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Embodiments of the present invention relate to networking with media fingerprints. In a particular instance, an embodiment relates to social networking, using media fingerprints. An information element, uniquely related to a media fingerprint that is uniquely derived from a media content portion during play out thereof, is provided to a first web page. The first web page stores the information element with an associated first information set, which relates to one or more media fingerprints. One or more second web pages store at least a second information set, which relates to one or more media fingerprints. The first and at least second web pages are accessed and crawled in relation to the first and the at least second information sets. One or more information elements, which are common to the first and the at least second information sets, are indexed. The first web page and the at least one of the second web pages are related based on the indexed common information elements. An embodiment may relate to networked advertising with media fingerprints and, in particular, an embodiment relates to advertising with social networking.

Example embodiments may be described herein with terms, procedures, and systems that relate to associating information with media content, as set forth in U.S. Provisional Patent Application No. 61/026,444, filed Feb. 5, 2008 by Claus Bauer and Wenyu Jiang and entitled "Associating Information with Media Content," which is incorporated by reference in its entirety for all purposes as if fully set forth herein.

Social network services are typically web based applications hosted by entities such as Twitter™, LinkedIn™, MySpace™, Facebook™, Bebo™, Friendster™ and Orkut™. Social network services use software to build online social networks. Online social networks allow virtual communities to exist. For instance, people who share common interests, likes or activities may interact online using web based social networks.

Social network users typically create a profile for themselves, for instance, with a personalized web page or similar document, which may be rendered with Hypertext Markup Language (HTML) or the like. Like other web pages, personalized web pages may include a variety of information, meta data, links, embedded objects, and/or tags, which may be stored, for instance, with a client computer associated with a social network user, a server, database or the like. Content stored with a personalized web page may characterize the social network user in various ways. For example, the content may reflect, represent, present or aver a user's interests, likes, preferences, causes, preferences or activities (e.g., aesthetic, intellectual, cultural, athletic, social, political, commercial, etc.). Such characterization may be used to promote interaction with other users, who may be characterized in one or more similar or compatible ways.

Embodiments of the present invention allow an effectively user-facing application of media fingerprinting. Media fingerprints are unique representations of media content portions that are derived from actual components of the media content. Media fingerprinting allows reliable content identification that is robust against transcoding, spatial, temporal, geometric, and other changes to which media content may be exposed. Media fingerprints may thus be used for protecting content from piracy or illegitimate use and to present associated "auxiliary" information, such as advertisements or educational material, along with the media content.

Embodiments of the present invention allow social networking based on information related, e.g., directly, to the fingerprints. For instance, embodiments use media fingerprinting technology to establish social connections, "people search," and related applications. Thus, embodiments may be used with social networking services.

Embodiments of the present invention allow social networks to be established, e.g., between two or more web pages associated with a network, at least in part on the basis of one or more media fingerprints that relate each thereto in common. The common media fingerprints may be stored in association therewith. For example, the common media fingerprints may be stored locally (e.g., proximately), such as on a drive in the same, or an associated, client computer, etc. The common media fingerprints may also, or alternatively, be linked with each web page. In an embodiment, media fingerprints may be databased wherein a link is established, which indexes the fingerprint to a universal resource locator (URL), which is uniquely and/or identifiably associated with each webpage. The fingerprints may relate to any media content or portion thereof. For example, the media fingerprints may relate to particular scenes, or portions of songs or scenes in a movie.

An embodiment crawls the various webpages associated with the network and, upon indexing information returned each therefrom that is significant in relation to the media fingerprints, compiles and compares statistics therefrom. An embodiment may also function during content upload, streaming or playout. For example, fingerprints may be computed from content uploading to webpages or streaming or playing out with a media application in real time or near real time.

Upon detecting a statistically significant relationship between the media fingerprint populations associated with two or more of the web pages, a social relationship, e.g., a "social network," is established to exist between the webpages. Statistical significance may be set for any overlap in the fingerprint populations associated with each of the webpages. Thus, establishing a social network between webpages may be initiated or triggered based, at least in part, on any statistical correlation between the webpages, which may be useful or convenient any given application. A social network between two or more web pages may thus be based, at least in part, on detecting that they each share a statistically significant portion of media fingerprints that are associated with one or more particular songs or movie scenes.

Moreover, embodiments allow advertisements and other auxiliary information to be presented to target audiences based, at least in part, on the information related, e.g., directly, to the fingerprints.

In an example embodiment, a media player is disposed with a personal computing (PC), communications, or consumer electronic (CE) device or similarly capable platform. The media player allows a user, while accessing, watching and/or listening to audio, video or multi-media content, to "capture," at any time during the content play out, a media fingerprint, which is derived from the content, e.g., as described at length in Appendix A. For example, a specific scene of a movie or TV show, or a particular phrase in a song or audio recording, that the user relates to in some particular way (e.g., personally, aesthetically, emotionally, intellectually, politically, commercially, etc.).

In an embodiment, the captured media fingerprint is "uploaded" and/or inserted into a web page or other HTML document, such as a personalized user web page on a social networking service. The media fingerprint is added to the web page as a piece of meta data (which may be hidden) related thereto, as an explicitly visible "tag," or an embedded object. Alternatively or additionally, the media fingerprints may be stored in a client computer associated with the user, a server, database or the like, e.g., where storage or bandwidth are not constrained. Embodiments may relate to a system, apparatus, or other media player application or functionality, as well as related processes and algorithms.

Web "crawling" engines and related web "indexing" engines operated for example by existing search entities (e.g., Google™, Yahoo™, MSN™) or new, dedicated search engines, may be used with an embodiment of the present invention. New search services may be provided according to an embodiment, which essentially "connect" users that have, e.g., in common, or share specific or matching uploaded, inserted or embedded information elements that relate to certain media fingerprints. Matches may be perfect or near-perfect, or conform to some level of statistical specificity. For example, the web pages of two social network "neighbors" may be matched upon detecting that a majority (e.g., >50%) or a super-majority (e.g., >⅔) of the information elements associated with each, which relate to common media fingerprints (e.g., derived from an identical portion of media content) match. In an example implementation, a match-up of 70% of media fingerprint related information elements between two or more users may suffice in certain applications to relate (e.g., establish a relationship between) their web pages.

An embodiment thus relates to allowing users to create a unique "web presence," which captures and/or characterizes interests and preferences (e.g., likes and/or dislikes) based, at least in part, on the media content that they like to watch and/or listen to, as demonstrated by the match-up in information elements related to their respective media fingerprint "collections," shared over their respective web pages. Moreover, this feature provides for social connectivity associated with these interests, preferences, likes and dislikes; again, based at least in part, on the match-up in their respective media fingerprint collections. Embodiments thus relate to search and other web based processes and algorithms.

In an embodiment of the present invention, match-ups between information elements are used by advertisers for creating or providing targeted advertisement, based on the media content or content portions identified by the media fingerprint collections. Advertisement may thus be targeted on the basis of the media content (e.g., the movie, TV show, song, etc.) from which the media fingerprints are derived. Moreover, an embodiment allows detailed insight on users to be gained therewith, e.g., based on a specific song lyric or scene (e.g., fight scene, love scene, chase scene, etc.) or image feature (e.g., car, gun, flowers, etc.).

Embodiments relate to media fingerprinting usage that is user aligned; e.g., an embodiment relates to an end-user social application. An embodiment of the present invention does not require massive database fingerprint storage on the end user side (which however, may alternatively or additionally be exploited, as available). An embodiment relates to a web-site or similar paradigm.

Moreover, an embodiment of the present invention functions without pre-generating, pre-deriving, or pre-storing media fingerprints (which however, may alternatively or additionally be exploited, as available). In an embodiment, media fingerprints are captured dynamically and on-the-fly, with the play out of the media content from which they are derived (computed). Embodiments may function with commercial content, user-generated content, and derivative content with essentially comparable efficacy and efficiency.

Example System

FIG. 1 depicts an example system 100, according to an embodiment of the present invention. A web page 104, for instance, a personal web page associated with a social networking services user (e.g., "Joe") is accessible with a network 125. Web page 104 includes information 116, which relates to unique media fingerprints (and perhaps others; or at least one). Information 116 may include information elements such as meta data (e.g., which may be hidden), a tag (e.g., which may be visible), an embedded object or the like.

A media player 106 functions to play media content and derive media fingerprints from portions thereof. Media player 106 provides information elements FP1, FP2 and FP3, which uniquely relate to the derived media fingerprint (and which, in turn uniquely correspond to the media content portion from which they are derived). Information elements FP1, FP2 and FP3 are included with information 116 in web page 104.

Media player 101 has a display (and/or a speaker) 106, for presenting media content to a user. The media player may have a media start "button" 102, a media pause or stop "button" 103 and similar features and functions. Media player 101 has a capture function 111, for capturing media fingerprints that correspond to media content portions that a user deems particularly noteworthy, special, "worth remembering" or "replaying," or the like.

Fingerprint capture function 111 may be triggered by a user input or initiated automatically. Automatic initiation may be triggered by detecting certain actions or behaviors of a user of media player 101, such as applause, laughter, haptically detectable agitation (e.g., fidgeting or jumping in a seat), or detecting that a user replays certain media content or a particular portion thereof a significant number of times (e.g., beyond a threshold within a certain time or in comparison to other media content)

One or more other (e.g., "second," in relation to web page 104 as a "first") web pages, e.g., web page 134, are associated with other users of the social networking service (e.g., "Jane"). Web pages 134 are accessible with network 125. Web pages 134 include information 146 such as information elements FP4, FP2 and FP3 (e.g., and others; or at least one), which relate to media fingerprints.

A search engine 121 has a crawl function 123 and an index function 122. In an implementation, crawl function 123, index 122 and search engine 121 operate with features and functions similar to those used in web search services (e.g., Google™, etc.) or specialized search services (e.g., Lexis/Nexis™).

Search engine 121 accesses web page 104 and web pages 134 with network 125. Crawl function 123 crawls the first information elements 116 and the second information elements 146 and returns information relating to the content therein. In a context related to an embodiment, crawl function 123 returns information that relates to information elements 116 and 146.

In an embodiment, index function 122 processes the information returned with crawl function 123. Index function 122 indexes one or more of the information elements that are common to the first information and the second information. For example, information elements FP2 and FP3 are indexed by index function 122 as common to both web page 104 and web page 134.

Thus, search engine 121 establishes a relationship between the web page 104 and web page 134 that is based, at least in part, on the one or more common information elements FP2 and FP3 within their respective media fingerprint information 116 and 146. In an embodiment, the strength of the relationship between web pages 104 and 134 may be inferred with statistical analysis related to how many, or what percentage or fraction of their media fingerprint related information elements match. The indexed information, including the matches between fingerprint information elements at web page 104 and web page 146, may be provided to an application, database, server or entity, which may further process and statistically analyze the matches and/or related information.

An advertisement ("Ad") database or server 165 may link, index, or otherwise relate advertisements to users of the social networking services based on the information elements stored with their respective personal web sites. In an embodiment, advertisement database/server 165 exchanges queries and corresponding results 166 with search engine 121. Based on the query results, advertisement database/server 165 associates certain advertisements with the social networking services users and provides targeted advertisements 167 to the users.

The advertisements may be presented, for example, with the media player 101 to the social networking services user associated therewith (e.g., "Joe"). Alternatively or additionally, the advertisements may be rendered with or as content of web pages 104 and 134.

Example Procedure

Figure 2:
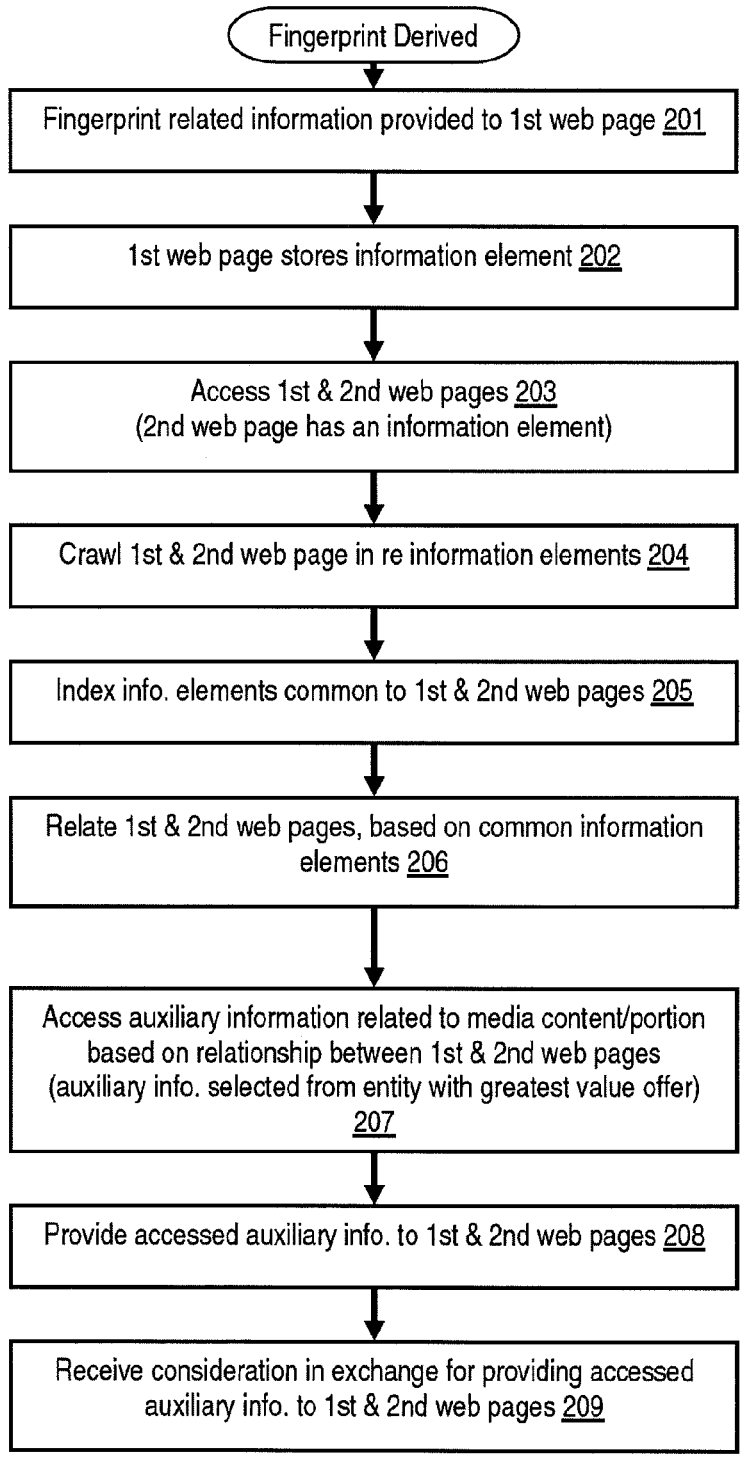
FIG. 2 depicts an example procedure, according to an embodiment of the present invention.

FIG. 2 depicts an example procedure 200, according to an embodiment of the present invention. In step 201, information is provided to a first web page of a network (e.g., web page 104, network 125; FIG. 1). The information uniquely relates to a media fingerprint, which is uniquely derived from a portion of media content during play out thereof. The media content portion may play out with a media player application, which may be associated with a user of the first web page.

The network may be related to social networking services. The network may also have a number (e.g., at least a second, one or more, etc.) of other (e.g., "second") web pages. The first web page may be a personal web page of the user. The second web pages may be personal web pages of other users of the social networking services.

In step 202, the first web page stores the information as an element with an associated first information set (e.g., information set 116; FIG. 1), which relates to one or more media fingerprints. The second web pages may also store information elements that relate to media fingerprints. The information elements may include meta data, tags, links, embedded objects, or the like.

In step 203, the first and second web pages are accessed, such as with a search engine associated with the network (e.g., search engine 121; FIG. 1). In step 204, the first and second web pages are crawled in relation to their content, including the information elements that they store, which relate to media fingerprints. In step 205, fingerprint related information elements that are common to each of the first and second web pages are indexed in association therewith. The web pages may be crawled and indexed by the search engine (e.g., crawl function 123, index function 122; FIG. 1).

Embodiments of the present invention allow social networks to be established, e.g., between two or more web pages associated with a network, at least in part on the basis of one or more media fingerprints that relate each thereto in common. The common media fingerprints may be stored in association therewith. For example, the common media fingerprints may be stored locally (e.g., proximately), such as on a drive in the same, or an associated, client computer, etc. The common media fingerprints may also, or alternatively, be linked with each web page. In an embodiment, media fingerprints may be databased wherein a link is established, which indexes the fingerprint to a universal resource locator (URL), which is uniquely and/or identifiably associated with each webpage. The fingerprints may relate to any media content or portion thereof. For example, the media fingerprints may relate to particular scenes, or portions of songs or scenes in a movie.

An embodiment crawls the various webpages associated with the network and, upon indexing information returned each therefrom that is significant in relation to the media fingerprints, compiles and compares statistics therefrom. An embodiment may also function during content upload, streaming or playout. For example, fingerprints may be computed from content uploading to webpages or streaming or playing out with a media application in real time or near real time.

Upon detecting a statistically significant relationship between the media fingerprint populations associated with two or more of the web pages, a social relationship, e.g., a "social network," is established to exist between the webpages. Statistical significance may be set for any overlap in the fingerprint populations associated with each of the webpages. A social network establishing statistical significance may be based, at least in part, on a relatively high probability of indexed fingerprints being associated with each of the webpages. Thus, establishing a social network between webpages may be initiated or triggered based, at least in part, on any statistical correlation between the webpages, which may be useful or convenient any given application. A social network between two or more web pages may thus be based, at least in part, on detecting that they each share a statistically significant portion of media fingerprints that are associated with one or more particular songs or movie scenes.

For example, a first website may have one or more fingerprints that correspond to a first portion of media content, such as frames of music or a movie from a time T0 through a time TN. A second website may have one or more fingerprints that correspond to a second media content portion, e.g., temporally proximate to the first content portion, such as from Time T1-TN, where T1 is temporally proximate, e.g., within a few frames at a given frame rate, within a few frames of T0. A third website may have one or more fingerprints that correspond to a third media content portion that is temporally proximate, in relation to the temporal proximity shared by T0, T1 and T2, to the first content portion, such as from Time T2-T(N−1). Time T2 is temporally proximate to time T1 and thus possibly to a somewhat less significant degree, with time T0. Time T(N−1) is temporally proximate to time TN. A fourth website may have one or more fingerprints that correspond to a fourth media content portion, e.g., corresponding to frames from T3-T(N−1). T3 is not quite temporally proximate, relative to the temporal proximity shared by T0, T1 and T2, to T0. A fifth website. A fifth website may have one or more fingerprints that correspond to a fifth media content portion, e.g., corresponding to frames from T4-T(N−2). T4 lacks significant temporal proximity to T0, and perhaps to one or more of T1-2, or perhaps even to T3. T(N−2) lacks significant temporal proximity to TN, and perhaps even to T(N−1).

Upon indexing the contents of the first-through-fifth webpages, detecting the fingerprints associated each therewith and comparing the fingerprint content statistically, it may be determined that a substantial (e.g., very strong) statistical probability exists of finding matching fingerprints between the first and second webpages. It may also be determined that a significant probability, which may be somewhat less than the substantial probability of matches between the first and second webpages, exists of finding matching fingerprints between the first and the third webpage (and perhaps a very strong probability of finding matching fingerprints between the second and third webpages).

Between the first and the fourth webpages, there may or may not remain a significant probability of finding matching fingerprints. Finding statistically significant matches between the first and the fourth webpages may depend on where the threshold for statistical significance is set for a given networking application. Where statistical significance is detected between the first and the fourth webpages, it may not be as significant as the substantial significance of matching fingerprints between the first and third webpages. Between the first and the fifth webpages, no statistically significant probability of matching fingerprints may be detected, relative to the significance of matching fingerprints between the first and second, third and even fourth webpages (again though, depending on where the significance threshold is set for a particular application). Thus, an embodiment may establish a strong social network between the first and second webpages.

A social network may also be established between the first and third webpages and, depending on where the significance threshold is set, between the first and the third webpages. No social network may be established however between the first and the fifth webpages. As with establishing a social network between the other webpages though, not establishing a social website between webpages is based, at least in part, on the significance threshold that's set for a given application and, where the significance threshold is lowered, a social network may be yet established even based on the existing probabilities (although they are lower than those that exist between the first and the second and third webpages). Moreover, while a social network may or may not be established between the first and fourth webpages, and while no social network may be established between the first and fourth webpages, social networks may or may not be established between the second, third fourth and/or fifth webpages, based on the probabilities that exist of finding common fingerprints between them.

In step 206, the first and the second web pages are related based on the fingerprint related information elements that are common to them, e.g., according to the statistical probability of matching fingerprints between them. An embodiment thus provides search services, which essentially "connect" users who have associated personal social networking services web pages that share in common specific or matching uploaded, inserted or embedded information elements that relate to certain media fingerprints.

A relationship is thus established between web pages with common fingerprint related information elements. To establish the relationship between (e.g., to relate) the web pages, certain match criteria may be applied. An embodiment may thus relate web pages based on a perfect or near-perfect match between their common information elements. An embodiment may thus relate web pages based on conformance to some level of statistical specificity, marketing analysis conformance or the like. A statistical probability of a 1%, 5%, 10% or some other statistical probability of matching fingerprints exists between webpages may establish a significance threshold.

For example, the web pages of two social network "neighbors" may be matched upon detecting that a majority (e.g., >50%) or a super-majority (e.g., >⅔) of the information elements associated with each, which relate to common media fingerprints (e.g., derived from an identical portion of media content) match. In an example implementation, a match-up of 70% of media fingerprint related information elements between two or more users may suffice in certain applications to relate their respective web pages.

Figure 3:
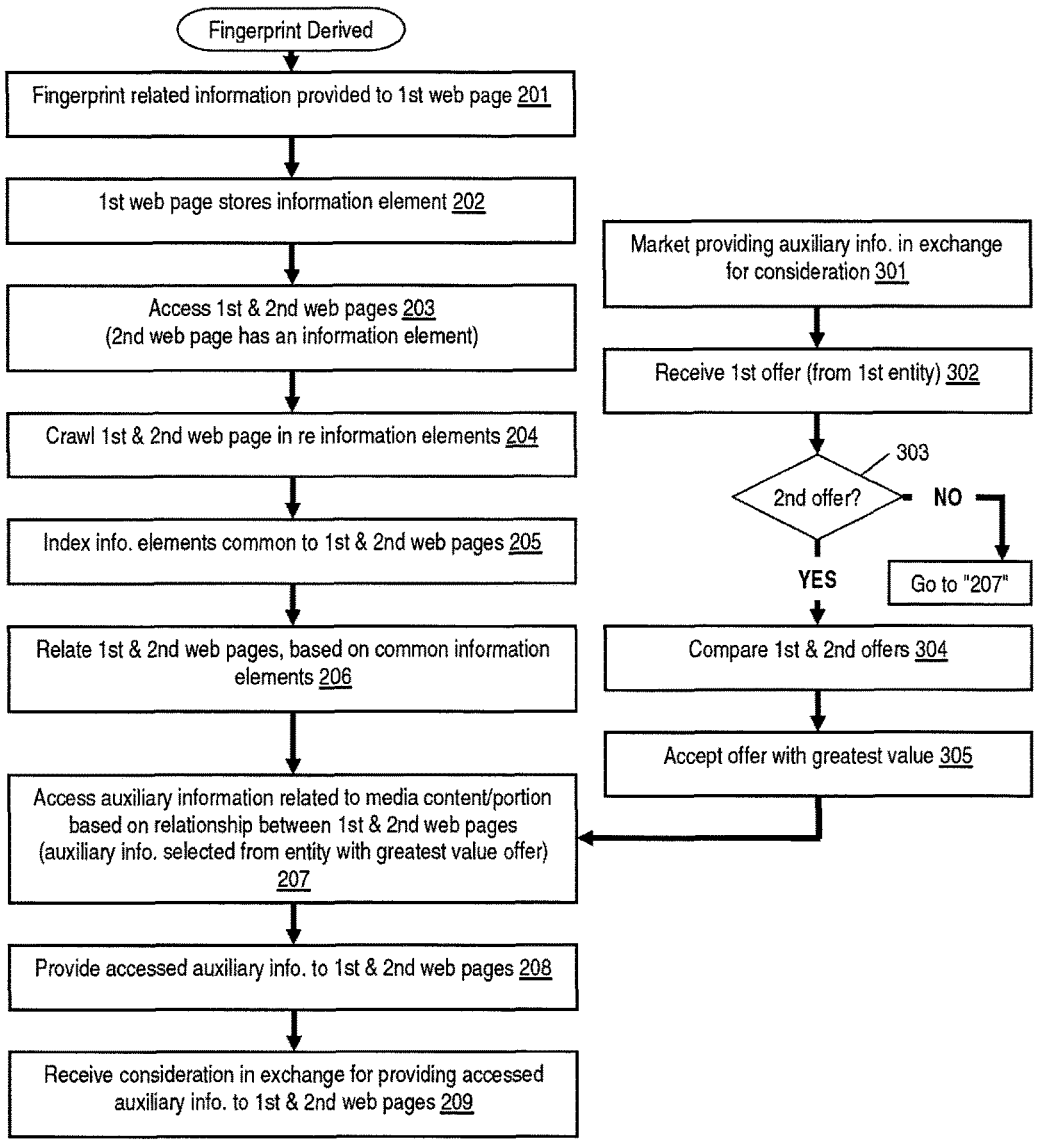
FIG. 3 depicts another example procedure, according to an embodiment of the present invention.

FIG. 3 depicts an example procedure 300, according to an embodiment of the present invention. Procedure 300 may be performed with, or include steps of procedure 200 (FIG. 2), and is thus shown therewith in FIG. 3. Steps of procedures 200 and/or 300 may be performed in an order that differs somewhat from that described herein, with reference to FIG. 2-FIG. 3, and one or more steps may be optional (e.g., selectively) in some embodiments. Moreover, some steps of procedures 200 and/or 300 may be performed at a different time than other steps of the procedure, essentially simultaneous therewith, or in real time or near real time in relation to other steps of the procedure.

Auxiliary information such as an advertisement (e.g., "advertising media content," advertising, etc.) may relate to the media content or a portion thereof that is uniquely identifiable with the media fingerprints derived therefrom. Advertising or other auxiliary information may be presumed significant to the relationship established between the first and the second web pages or presumed commercially effective based thereon. In step 207, advertising thus relevant is identified and selectively accessed.

For instance, an advertisement may be targeted to multiple users who are associated with a "related group" of web pages. The advertisement may thus be targeted to the users on the basis of the relationship between their respective personal web pages. Selecting a particular advertisement for presentation may involve statistical, demographic, marketing or similar analysis. In step 208, the accessed advertisement or other auxiliary information is provided to the users associated with the first and the second web pages.

For example, the auxiliary information may be displayed by media players respectively associated with the users. Such presentation may be made in temporal or spatial association with the play out of media content related to the information elements common to the users of the first and second web pages. For example, an advertisement may be displayed in real time or near real time, and on the same monitor space with which media content is displayed at play out time. Alternatively or additionally, the auxiliary information may be rendered as content on the first and the second web pages.

In step 209, consideration (e.g., valuable consideration), such as in the form of payment, remuneration, credit, or the like, is received in exchange for providing the accessed auxiliary information to the users associated with the first and the second web pages. The consideration may be received from an entity associated with the auxiliary information, such as a commercial enterprise, an advertising service, or the like. Thus, an entity (e.g., a social networking service) that provides access to the first and the second web page and provides the advertisement to the users associated therewith may receive a fee from another entity (e.g., the commercial enterprise or advertising service) in consideration for providing the advertisement in accordance with embodiments described herein.

In step 311, the provision of advertising and other auxiliary information according to embodiments described herein, in exchange for valuable consideration, is marketed. Thus, the entity (e.g., social networking service) that provides the auxiliary information to the users may market the exchange of availability of, or access to, a targeted advertising channel to the other (e.g., commercial, advertising) entity.

In step 312, a first offer of consideration, which has a certain first value, is received by the providing entity (e.g., social networking service) from a first (e.g., commercial, advertising) entity. In step 313, it is determined whether at least a second offer is received by the providing entity. Virtually any number of offers may be received by the providing entity. If no second offer is received, then the auxiliary information associated with the first offer is accessed; thus step 207 may be performed, as described above.

If a subsequent (e.g., second) offer is received from an entity other than the first entity (e.g., a second entity) in step 314, the first and subsequent offers are compared in relation to the values respectively associated with each of their offered consideration. In step 315, the offer of consideration that has the greatest value is accepted. Upon accepting this "best" offer, the auxiliary information associated with the best offer is accessed; thus step 207 may be performed, as described above. Embodiments thus allow a social networking service, for example, to provide targeted advertisements from the highest bidding advertisers, and thus maximize their advertising revenue.

An embodiment of the present invention thus relates to networking, e.g., social networking, with media fingerprints. An embodiment also relates to advertising with media fingerprints, e.g., in a social networking context or application. An information element, uniquely related to a media fingerprint that is uniquely derived from a media content portion during play out thereof, is provided to a first web page. The first web page stores the information element with an associated first information set, which relates to one or more media fingerprints. One or more second web pages store at least a second information set, which relates to one or more media fingerprints. The first and at least second web pages are accessed and crawled in relation to the first and the at least second information sets. One or more information elements, which are common to the first and the at least second information sets, are indexed. The first web page and the at least one of the second web pages are related based on the indexed common information elements.

An embodiment of the present invention may relate to one or more of the example embodiments, enumerated below.

1. A method, comprising:

providing, to a first web page of a network, an information element that uniquely relates to a media fingerprint, which is uniquely derived from a portion of media content during play out thereof; and wherein the first web page stores the information element with an associated first information set, which relates to one or more media fingerprints;

accessing the first web page and one or more second web pages of the network, wherein at least a second information set, which relates to one or more media fingerprints, is associated with at least one of the second web pages;

crawling the accessed first web page and the one or more second web pages in relation to the first and the at least second information sets;

indexing, one or more information elements that are common to the first and the at least second information sets; and relating the first web page and the at least one of the second web pages based on the indexed common information elements.

2. The method as recited in enumerated example embodiment 1 wherein the first web page stores an instance of the information element.

3. The method as recited in enumerated example embodiment 1 wherein one or more of the first web page and the second web pages comprise social web page content.

4. The method as recited in enumerated example embodiment 1 wherein the first web page is associated with a media player, which plays out the media content, derives the media fingerprint from the media content portion and provides the media fingerprint related information element to the first web page.

5. The method as recited in enumerated example embodiment 4 wherein the media player selectively derives the media fingerprint.

6. The method as recited in enumerated example embodiment 5 wherein the media player derives the media fingerprint based, at least in part, on a preference that relates to the media content portion.

7. The method as recited in enumerated example embodiment 1 wherein the media fingerprint is derived in real time, in relation to the play out of the media content portion.

8. The method as recited in enumerated example embodiment 1 wherein the information element comprises one or more of meta data that relates to the media content portion or a tag.

9. The method as recited in enumerated example embodiment 1, further comprising:

accessing auxiliary information that relates to one or more of the media content or the media content portion based on the relating step; and providing the accessed auxiliary information to a client device that is associated with one or more of the first or the second web pages.

10. The method as recited in enumerated example embodiment 9 wherein the auxiliary information comprises an advertisement.

11. A system, comprising:

a first web page that is accessible with a network and comprises first information, which relates to at least one media fingerprint;

a media player application for playing media content, deriving a media fingerprint from a portion of the media content, and providing to the first web page an information element that uniquely relates to the derived media fingerprint;

wherein the media fingerprint uniquely corresponds to a portion of the media content; and wherein the first web page includes the derived media fingerprint information element related with the first information;

one or more second web pages that are accessible with the network and comprise second information, which relates to at least one media fingerprint; and a search engine that accesses the first web page and the one or more second web pages, crawls the first information element and the second information elements, and indexes one or more information elements that are common to the first information and the second information;

wherein a relationship between the first web page and the one or more second web pages is established based, at least in part, on the one or more common information elements.

12. The system as recited in enumerated example embodiment 11 wherein the first web page stores an instance of the information element.

13. The system as recited in enumerated example embodiment 11 wherein one or more of the first web page and the second web pages comprise social web page content.

14. The system as recited in enumerated example embodiment 11 wherein the media player selectively derives the media fingerprint.

15. The system as recited in enumerated example embodiment 14 wherein the media player derives the media fingerprint based, at least in part, on a preference that relates to the media content portion.

16. The system as recited in enumerated example embodiment 11 wherein the media fingerprint is derived in real time, in relation to the play out of the media content portion.

17. The system as recited in enumerated example embodiment 11 wherein the information element comprises one or more of meta data that relates to the media content portion or a tag.

18. The system as recited in enumerated example embodiment 11, further comprising:

a repository of auxiliary information that relates to one or more of the media content or the media content portion;

wherein the auxiliary information is accessed based on the common information elements.

19. The system as recited in enumerated example embodiment 18 wherein the accessed auxiliary information is provided to a client device that is associated with one or more of the first or the second web pages.

20. The system as recited in enumerated example embodiment 19 wherein the auxiliary information comprises an advertisement.

21. A computer readable storage medium comprising code which, when executed with one or more processors, configures, at least in part, a system as recited in one or more of enumerated example embodiments 11-20.

22. A method, comprising the steps of:

providing, to a first web page, an information element that uniquely relates to a media fingerprint, which is uniquely derived from a portion of media content during play out thereof; and wherein the first web page stores the information element with an associated first information set, which relates to one or more media fingerprints;

accessing the first web page and one or more second web pages wherein at least a second information set, which relates to one or more media fingerprints, is associated with at least one of the second web pages;

crawling the accessed first web page and the one or more second web pages in relation to the first and the at least second information sets;

indexing, one or more information elements that are common to the first and the at least second information sets;

relating the first web page and the at least one of the second web pages based on the indexed common information elements;

accessing auxiliary information that relates to one or more of the media content or the media content portion based on the common information elements; and providing the accessed auxiliary information to a client device that is associated with one or more of the first or the second web pages; and receiving consideration in exchange for the providing the accessed auxiliary information step from an entity associated with the auxiliary information.

23. The method as recited in enumerated example embodiment 22 wherein the auxiliary information comprises an advertisement.

24. The method as recited in enumerated example embodiment 23 wherein the advertisement comprises a first advertisement of a plurality of advertisements, which comprises at least a second advertisement;

wherein the entity related to the first advertisement comprises a first advertising entity;

wherein the at least second advertisement is associated with a second advertising entity; and wherein the method further comprises the steps of:

receiving a first offer from the first entity, which relates to the consideration;

receiving a second offer from the second entity, which relates to the consideration; and comparing the first offer and the second offer;

wherein the first advertisement is provided based, at least in part, on a first value associated with the consideration that relates to the first offer, exceeding a second value associated with the consideration that relates to the second offer.

25. The method as recited in enumerated example embodiment 22, further comprising the step of:

marketing the exchange.

26. A computer readable storage medium comprising code which, when executed with one or more processors, controls, at least in part, a method as recited in one or more of enumerated example embodiments 22-25.

27. A system, comprising:

means for performing one or more steps of a method as recited in one or more of enumerated example embodiments 22-25.

28. A computer readable storage medium comprising code which, when executed with one or more processors, configures, at least in part, a system as recited in enumerated example embodiment 27.

29. A computer readable storage medium comprising code which, when executed with one or more processors, controls, at least in part, a method as recited in one or more of enumerated example embodiments 1-10.

30. A system, comprising:

means for performing one or more steps of a method as recited in one or more of enumerated example embodiments 1-11.

31. A computer readable storage medium comprising code which, when executed with one or more processors, configures, at least in part, a system as recited in enumerated example embodiment 30.

Equivalents, Extensions, Alternatives And Miscellaneous

Example embodiments for networking and advertising with media fingerprints are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:

providing, to a first web page, an information element that uniquely relates to a media fingerprint uniquely derived from a media content portion, the media fingerprint being captured by and received from a media device that plays the media content portion, wherein the media fingerprint uniquely derived from the media content portion is stored with a computing device;

wherein the media fingerprint comprises one or more of:

an acoustic fingerprint that is generated from a particular audio waveform as code that uniquely corresponds to the particular audio waveform; or a video fingerprint that comprises a low bit rate representation of video content from which it is derived and uniquely corresponds to the video content and, which is computed from characteristic components of the video content to which the video fingerprint corresponds, wherein the characteristic components comprise one or more of luminance, chrominance, or motion descriptors of the video content; and determining one or more media fingerprints that are related to one or more information elements that are provided to one or more second web pages, the one or more media fingerprints being captured by and received from one or more second media devices that play one or more media data portions from which the one or more media fingerprints are uniquely derived;

establishing a relationship between the first web page and the one or more second web pages based on one or more matching criteria applied to (a) the media fingerprint related to the information element that is provided to the first webpage and (b) the one or more media fingerprints related to the one or more information elements that are provided to the one or more second web pages;

based on the established relationship between the first web page received by the media device and the one or more second web pages, providing auxiliary information to the one or more second media devices for rendering on the one or more second media devices;

wherein the method is performed by one or more computing devices.

2. The method as recited in claim 1 wherein the first web page stores an instance of the information element.

3. The method as recited in claim 1 wherein one or more of the first web page and the second web pages comprise social web page content.

4. The method as recited in claim 1 wherein the media player plays out the media content portion, derives the media fingerprint from the media content portion and provides the media fingerprint related to the information element to the first web page.

5. The method as recited in claim 1 wherein the media player selectively derives the media fingerprint.

6. The method as recited in claim 1 wherein the media player derives the media fingerprint based, at least in part, on a preference that relates to the media content portion.

7. The method as recited in claim 1 wherein the media fingerprint is derived in real time, in relation to the media content portion.

8. The method as recited in claim 1 wherein the information element comprises one or more of meta data that relates to the media content portion or a tag.

9. The method as recited in claim 1, further comprising:
accessing auxiliary information that relates to the media content portion; and
providing the accessed auxiliary information to a client device that is associated with one or more of the first or the second web pages.

10. The method as recited in claim 1 wherein the auxiliary information comprises an advertisement.

11. A system comprising:
a first web page that comprises an information element which uniquely relates to a media fingerprint uniquely derived from a media content portion, the media fingerprint being captured by and received from a media device that plays the media content portion, wherein the media fingerprint uniquely derived from the media content portion is stored with a computing device;
wherein the media fingerprint comprises one or more of:
an acoustic fingerprint that is generated from a particular audio waveform as code that uniquely corresponds to the particular audio waveform; or
a video fingerprint that comprises a low bit rate representation of video content from which it is derived and uniquely corresponds to the video content and, which is computed from characteristic components of the video content to which the video fingerprint corresponds, wherein the characteristic components comprise one or more of luminance, chrominance, or motion descriptors of the video content; and
one or more second web pages that comprise one or more information elements to which one or more media fingerprints are related; and
a search engine that determines the one or more media fingerprints that are related to the one or more information elements in the one or more second web pages, the one or more media fingerprints being captured by and received from one or more second media devices that play one or more media data portions from which the one or more media fingerprints are uniquely derived, establishes a relationship between the first web page and the at least one of the one or more second web pages based on one or more matching criteria applied to (a) the media fingerprint related to the information element that is provided to the first webpage and (b) the one or more media fingerprints related to the one or more information elements that are provided to the one or more second web pages, and based on the established relationship between the first web page received by the media device and the one or more second web pages, provides auxiliary information to the one or more second media devices for rendering on the one or more second media devices.

12. The system as recited in claim 11 wherein the first web page stores an instance of the information element.

13. The system as recited in claim 11 wherein one or more of the first web page and the second web page comprise social web page content.

14. The system as recited in claim 11 wherein the media player plays out the media content portion and selectively derives the media fingerprint from the media content portion.

15. The system as recited in claim 11 wherein the media player derives the media fingerprint based, at least in part, on a preference that relates to the media content portion.

16. The system as recited in claim 11 wherein the media fingerprint is derived in real time, in relation to the media content portion.

17. The system as recited in claim 11 wherein the information element comprises one or more of meta data that relates to the media content portion or a tag.

18. The system as recited in claim 11, further comprising:
a repository of auxiliary information that relates to the media content portion;
wherein the auxiliary information is accessed based on the common information elements.

19. The system as recited in claim 18 wherein the accessed auxiliary information is provided to a client device that is associated with one or more of the first or the second web pages.

20. The system as recited in claim 11 wherein the auxiliary information comprises an advertisement.

21. A non-transitory computer readable storage medium product comprising code which, when executed with one or more processors:
causes or controls the processors to control a computer to perform steps of a method, the method steps comprising:
providing, to a first web page, an information element that uniquely relates to a media fingerprint uniquely derived from a media content portion, the media fingerprint being captured by and received from a media device that plays the media content portion, wherein the media fingerprint uniquely derived from the media content portion is stored with a computing device;
wherein the media fingerprint comprises one or more of:
an acoustic fingerprint that is generated from a particular audio waveform as code that uniquely corresponds to the particular audio waveform; or
a video fingerprint that comprises a low bit rate representation of video content from which it is derived and uniquely corresponds to the video content and, which is computed from characteristic components of the video content to which the video fingerprint corresponds, wherein the characteristic components comprise one or more of luminance, chrominance, or motion descriptors of the video content; and
determining one or more media fingerprints that are related to one or more information elements that are provided to one or more second web pages, the one or more media fingerprints being captured by and received from one or more second media devices that play one or more media data portions from which the one or more media fingerprints are uniquely derived;
establishing a relationship between the first web page and the at least one of the one or more second web pages based on one or more matching criteria applied to (a) the media fingerprint related to the information element that is provided to the first webpage and (b) the one or more media fingerprints related to the one or more information elements that are provided to the one or more second web pages;

based on the established relationship between the first web page received by the media device and the one or more second web pages, providing auxiliary information to the one or second media devices for rendering on the one or more second media devices.

22. An apparatus comprising:

a subsystem, at least partly implemented in hardware, that provides, to a first web page, an information element that uniquely relates to a media fingerprint uniquely derived from a media content portion, the media fingerprint being captured by and received from a media device that plays the media content portion, wherein the media fingerprint uniquely derived from the media content portion is stored with a computing device;

wherein the media fingerprint comprises one or more of:

an acoustic fingerprint that is generated from a particular audio waveform as code that uniquely corresponds to the particular audio waveform; or a video fingerprint that comprises a low bit rate representation of video content from which it is derived and uniquely corresponds to the video content and, which is computed from characteristic components of the video content to which the video fingerprint corresponds, wherein the characteristic components comprise one or more of luminance, chrominance, or motion descriptors of the video content; and a subsystem, at least partly implemented in hardware, that determines the one or more media fingerprints that are related to the one or more information elements in one or more second web pages, the one or more media fingerprints being captured by and received from one or more second media devices that play one or more media data portions from which the one or more media fingerprints are uniquely derived;

and a subsystem, at least partly implemented in hardware, that establishes a relationship between the first web page and the at least one of the one or more second web pages based on one or more matching criteria applied to (a) the media fingerprint related to the information element that is provided to the first webpage and (b) the one or more media fingerprints related to the one or more information elements that are provided to the one or more second web pages, and based on the established relationship between the first web page received by the media device and the one or more second web pages, provides auxiliary information to the one or more second media devices for rendering on the one or more second media devices.

23. The method as recited in claim 1, wherein the first web page is of a first user, and wherein the one or more second web pages are of one or more second users different from the first user.

\* \* \* \* \*